United States Patent Office 3,595,864
Patented July 27, 1971

3,595,864
PYRIDYL-3,3-DI-LOWER ALKYL-3,4-DIHYDRO-ISOQUINOLINES
Ernst Seeger, Helmut Teufel, Wolfhard Engel, and Hans Machleidt, Biberach an der Riss, Germany, assignors to Boehringer Ingelheim G.m.b.H., Ingelheim (Rhine), Germany
No Drawing. Filed Mar. 6, 1968, Ser. No. 710,745
Claims priority, application Germany, Mar. 10, 1967, T 33,404
The portion of the term of the patent subsequent to July 21, 1986, has been disclaimed
Int. Cl. C07d *35/36*
U.S. Cl. 260—286          4 Claims

ABSTRACT OF THE DISCLOSURE

A novel process for the preparation of 1-pyridyl-3,4-dihydro-isoquinolines, which comprises dehydrating a corresponding 2-hydroxy - 1 - pyridyl-1,2,3,4-tetrahydro-isoquinoline.

---

This invention relates to a novel process for the preparation of 1-pyridyl-3,3-di-lower alkyl-3,4-dihydro-isoquinolines which comprises subjecting a 1-pyridyl-2-hydroxy-3,3-di-lower alkyl-1,2,3,4-tetrahydro-isoquinoline to a dehydrating reaction at elevated temperatures.

More particularly, we have discovered that a pyridyl-dihydroisoquinoline of the formula

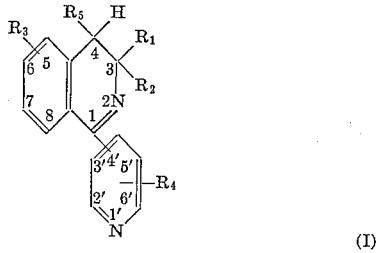

wherein $R_1$ and $R_2$, which may be identical to or different from each other, are each alkyl of 1 to 3 carbon atoms, and $R_3$, $R_4$ and $R_5$, which may also be identical to or different from each other, are each hydrogen or methyl, is obtained with very good yields by dehydrating a correspondingly substituted 2-hydroxy-1-pyridyl-1,2,3,4-tetrahydro-isoquinoline of the formula

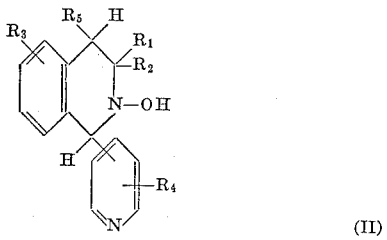

wherein $R_1$, $R_2$, $R_3$, $R_4$ and $R_5$ have the same meanings as in Formula I.

More specifically, we have discovered that dehydration, that is, the splitting off of a molecule of water, occurs when a compound of the Formula II is heated together with a base in the presence or absence of a solvent to a temperature above 30° C. and up to the boiling point of the solvent, if a solvent is used. Suitable bases for this purpose are inorganic bases, such as alkali metal hydroxides or alkaline earth metal hydroxides, or strong organic bases, especially alkali metal alcoholates or quaternary ammonium hydroxides. Suitable solvents are water or organic solvents, such as alcohols, aromatic hydrocarbons or mixtures thereof with water.

Dehydration may, however, also be achieved by heating a compound of the Formula II to a temperature between 100 and 250° C., preferably above its melting point; or by heating a compound of the Formula II in the presence of an inert organic solvent until the calculated amount of water has been formed. The water is advantageously continuously distilled off in the form of its azeotropic mixture with the solvent or with the aid of an entrainment agent added to the reaction mixture, and is removed from the recycling solvent or entrainment agent by means of a water separator inserted into the recycling line. Suitable solvents are aliphatic, cycloaliphatic, substituted or unsubstituted aromatic or aromatic-cycloaliphatic hydrocarbons, such as decane, decahydronaphthalene, xylene, o-dichlorobenzene, nitrobenzene, tetrahydronaphthalene or the like. The dehydration in the presence of a solvent is carried out at a temperature between 100 and 250° C., preferably 150 and 210° C.

It was not in any way foreseeable that a compound of the Formula II would undergo dehydration because it was heretofore not known that an N-hydroxy-heterocycle would split off a molecule of water and yield the corresponding unsaturated compound. For instance, it is known that the N-oxide of the addition product of 1,2,3,4-tetrahydroisoquinoline to an acrylic acid ester is transformed into 2-hydroxy-1,2,3,4-tetrahydroisoquinoline upon being heated at 80 to 90° C. with aqueous 2 N sodium hydroxide in the presence of potassium carbonate without concurrent dehydration [see I. Thesing and H. Mayer, Liebigs Annalen 609, 46–57 (1957), particularly at pages 50 and 56]. Moreover, during the preparation of the starting materials of the Formula II, even at temperatures above 100° C., with concentrated sulfuric acid or 100% phosphoric acid, both of which are known to be excellent dehydrating agents, no dehydration takes place; instead, the N-hydroxy compounds of the Formula II are obtained with good yields.

The starting compounds of the Formula II, which themselves are novel compounds, may be prepared by subjecting a pyridine aldoxime of the formula

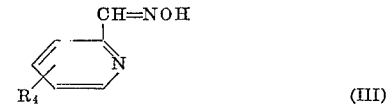

wherein $R_4$ has the same meaning as in Formula I, to a cyclization reaction with a compound of the formula

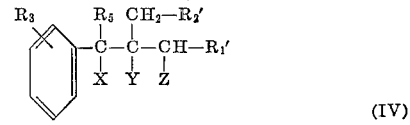

wherein $R_1'$ and $R_2'$, which may be identical to or different from each other, are hydrogen atoms or alkyls of 1 to 2 carbon atoms, and $R_3$ and $R_5$ have the same meanings as in Formula I, and one of X and Y is hydroxyl, esterified hydroxyl, such as acetoxy, or halogen while the other and Z are hydrogen, or Y together with X or Z represents a double bond, in the presence of a strong acid or a Lewis acid.

Those compounds of the Formula I wherein the bond from the 1-position of the dihydroisoquinoline nucleous is attached to the 3- or 4-position of the pyridyl substituent and their pharmaceutical utility are described in copending application Ser. No. 531,042, filed Mar. 2, 1966, now U.S. Pat. 3,457,265 whereas those wherein said bond is attached to the 2-position of the pyridyl substituent are new.

The compounds defined by Formula I are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, succinic acid, tartaric acid, citric acid, adipic acid, maleic acid, fumaric acid, 8-chlorotheophylline or the like. Such acid addition salts may be prepared by conventional methods, that is, for instance, by dissolving the free base in a suitable solvent and acidifying the solution with the desired inorganic or organic acid.

The following examples further illustrate the present invention and will enable others skilled in the art to understand it more completely. It should be understood, however, that the present invention is not limited solely to the examples given below.

EXAMPLE 1

3,4-dihydro-3,3-dimethyl-1-(pyridyl-4′)-isoquinoline

A solution of 2.54 gm. of 3,3-dimethyl-2-hydroxy-1-(pyridyl-4′)-1,2,3,4-tetrahydro-isoquinoline in 30 cc. of o-dichlorobenzene was refluxed for four hours. Thereafter, the dichlorobenzene was distilled off in vacuo, and the residue was crystallized from ethylacetate. 2 gm. of colorless crystalline 3,4-dihydro-3,3-dimethyl-1-(pyridyl-4′)-isoquinoline, M.P. 169° C., were obtained.

EXAMPLE 2

Using a procedure analogous to that described in Example 1, 3,4 - dihydro - 3,3 - dimethyl - 1-(6′-methyl-pyridyl-2′)-isoquinoline, M.P. 77° C., of the formula

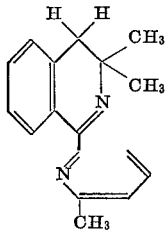

was obtained from 3,3-dimethyl-2-hydroxy-1-(6′-methyl-pyridyl-2′)-1,2,3,4-tetrahydro-isoquinoline.

EXAMPLE 3

Using a procedure analogous to that described in Example 1,3,4 - dihydro - 3,3-dimethyl-1-(pyridyl-2′)-isoquinoline, M.P. 105–106° C., of the formula

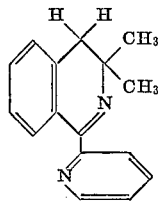

was obtained from 3,3-dimethyl-2-hydroxy-1-(pyridyl-2′)-1,2,3,4-tetrahydro-isoquinoline.

EXAMPLE 4

Using a procedure analogous to that described in Example 1, 3,4 - dihydro - 3,3-dimethyl-1-(pyridyl-3′)-isoquinoline, M.P. 96–97° C., was obtained from 3,3-dimethyl - 2 - hydroxy - 1 - (pyridyl-3′)-1,2,3,4-tetrahydro-isoquinoline.

EXAMPLE 5

Using a procedure analogous to that described in Example 1, 3,4 - dihydro - 3 - ethyl - 3 - methyl-1-(pyridyl-4′)-isoquinoline, M.P. 96° C., was prepared from 2-hydroxy - 3 - ethyl - 3 - methyl - 1 - (pyridyl-4′)-1,2,3,4-tetrahydro-isoquinoline, M.P. 200° C.

EXAMPLE 6

Using a procedure analogous to that described in Example 1, 3,4 - dihydro - 3,3 - diethyl - 1 - (pyridyl-4′)-isoquinoline, M.P. 60–61° C., was prepared from 2-hydroxy - 3,3 - diethyl - 1 - (pyridyl - 4′)-1,2,3,4-tetrahydro-isoquinoline, M.P. 194–195° C.

EXAMPLE 7

3,4-dihydro-3,3-dimethyl-1-(pyridyl-4′)-isoquinoline

A solution of 2.54 gm. of 3,3-dimethyl-2-hydroxy-1-(pyridyl-4′)-1,2,3,4-tetrahydro-isoquinoline in 30 cc. of decahydronaphthalene was gently refluxed for one and a half hours. Thereafter, the decahydronaphthalene was distilled off in vacuo, and the residue was crystallized from ethylacetate. 2.2 gm. of colorless crystalline 3,4-dihydro - 3,3 - dimethyl-1-(pyridyl-4′)-isoquinoline, M.P. 169° C., were obtained.

The same result was obtained when xylene was used as the solvent and the solution was refluxed for twelve hours while separating the water split off in a water separator connected to the reflux column.

EXAMPLE 8

2.54 gm. of 3,3-dimethyl-2-hydroxy-1-(pyridyl-4′)-1,2,3,4-tetrahydro-isoquinoline were heated for two hours at 200° C. in a drying chamber. Thereafter, the raw product was recrystallized from ethylacetate, yielding 2 gm. of crystalline 3,4-dihydro-3,3-dimethyl-1-(pyridyl-4′)-isoquinoline, M.P. 169° C.

EXAMPLE 9

2.5 gm. of 2-hydroxy-3,3-dimethyl-1-(pyridyl-4′)-1,2,3,4-tetrahydro-isoquinoline were admixed with 1 gm. of a 40% solution of benzyl-trimethyl-ammonium hydroxide in methanol and 45 cc. of aqueous 66% ethanol, and the mixture was heated for four hours at about 80° C. Thereafter, the reaction solution was evaporated to about one-half its volume, admixed with 100 cc. of water, and the crystalline product precipitated thereby was recrystallized from ethylacetate. 1.62 gm. of 3,4-dihydro-3,3-dimethyl-1-(pyridyl-4′)-isoquinoline, M.P. 168° C., were obtained.

EXAMPLE 10

A mixture of 5.1 gm. of 3,3-dimethyl-2-hydroxy-1-(pyridyl-4′)-1,2,3,4-tetrahydro-isoquinoline, 1.08 gm. of sodium methylate and 100 cc. of anhydrous benzene was refluxed for eight hours. Thereafter, the reaction solution was evaporated to dryness in vacuo, and the residue was recrystallized from ethylacetate. 3.8 gm. of odorless crystalline 3,4-dihydro - 3,3 - dimethyl-1-(pyridyl-4′)-isoquinoline, M.P. 168° C., were obtained.

EXAMPLE 11

A mixture of 2.54 gm. of 3,3-dimethyl-2-hydroxy-1-(pyridyl-4′)-1,2,3,4-tetrahydro-isoquinoline, 0.5 gm. of sodium hydroxide and 45 cc. of aqueous 66% methanol was refluxed for six hours. Thereafter, the reaction solution was diluted with about 150 cc. of water, and the crystalline precipitate formed thereby was collected and recrystallized from ethylacetate. 1.8 gm. of odorless crystalline 3,4 - dihydro-3,3-dimethyl-1-(pyridyl-4′)-isoquinoline, M.P. 169° C., were obtained.

EXAMPLE 12

A mixture of 2.55 gm. of 3,3-dimethyl-2-hydroxy-1-(pyridyl-4′)-1,2,3,4-tetrahydro-isoquinoline, 0.5 gm. of sodium methylate and 30 cc. of methanol was heated for eight hours at 40° C. Thereafter, the reaction solution was poured into water, and the crystalline precipitate formed thereby was collected and recrystallized from ethylacetate. 1.15 gm. of 3,4-dihydro-3,3-dimethyl-1-(pyridyl-4′)-isoquinoline, M.P. 168° C., were obtained.

EXAMPLE 13

A solution of 2.5 gm. of 3,3-dimethyl-2-hydroxy-1-(pyridyl-2′)-1,2,3,4-tetrahydro-isoquinoline (M.P. 153° C.) in 30 cc. of o-dichlorobenzene was refluxed for four hours. Thereafter, the dichlorobenzene was distilled off in vacuo, and the residue was recrystallized from petroleum ether. 2 gm. of colorless crystalline 3,4-dihydro-3,3-dimethyl-1-(pyridyl-2')-isoquinoline, M.P. 105–106° C., were obtained.

EXAMPLE 14

Using a procedure analogous to that described in Example 13, 3,4-dihydro-3,3-dimethyl-1-(6'-methyl-pyridyl-2')-isoquinoline, M.P. 77° C., was obtained from 3,3-dimethyl-2-hydroxy-1-(6'-methyl-pyridyl-2")-1,2,3,4 - tetrahydro-isoquinoline.

The novel compounds according to the present invention, that is, the 1-pyridyl-3,4-dihydro-isoquinolines embraced by Formula I wherein the bond from the 1-position of the dihydroisoquinoline nucleus is attached to the 2-position of the pyridyl substituent, have useful pharmacodynamic properties. More particularly, they have an activating effect upon the ferments or enzymes of the liver as indicated by gain in weight in animal livers [see H. Remmer, "Drugs As Activators of Drug Enzymes," First International Pharmacological Meeting 6, 235–256 (1962)], in warm-blooded animals, such as rats.

The liver ferment activating property of the compounds according to the present invention was ascertained by means of a standard pharmacological test, namely, the shortening effect upon barbiturate sleep in rats.

A group of ten adult laboratory rats were administered 75 mgm./kg. of hexobarbital intraperitoneally, and the average duration of sleep (suspension of the righting reflex) was determined for the group. Thereafter, to another group of ten test animals were given 7.5 mgm./kg. of the compound under investigation per os, and 24 hours later 75 mgm./kg. of hexobarbital were administered intraperitoneally. The average duration of sleep was again determined, and the reduction in the duration of hexobarbital sleep, if any, was expressed in terms of percent. The following results were obtained.

TABLE

Compound _____ 3,3-dimethyl - 1 - (pyridyl-2') - 3,4 - dihydro-isoquinoline.
Dose per os mgm./kg. ____ 7.5.
Reduction in duration of hexobarbital sleep, percent _____ 62.

For pharmaceutical purposes the novel compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.82 to 5.0 mgm./kg. body weight.

The following examples illustrate a few dosage unit compositions comprising a novel compound of the instant invention as an active ingredient and represent the best mode contemplated of putting the invention to practical use. The parts are parts by weight unless otherwise specified.

EXAMPLE 15

Tablets.—The tablet composition was compounded from the following ingredients:

| | Parts |
|---|---|
| 3,3 - dimethyl-1-(pyridyl-2')-3,4-dihydro-isoquinoline | 150.0 |
| Colloidal silicic acid | 100.0 |
| Lactose | 240.0 |
| Potato starch | 100.0 |
| Tartaric acid | 5.0 |
| Magnesium stearate | 5.0 |
| Total | 600.0 |

Compounding procedure.—The isoquinoline compound was admixed with the colloidal silicic acid, the lactose and one-half of the indicated amount of potato starch, the mixture was moistened with an aqueous 3.5% solution of the tartaric acid, the moist mass was forced through a 1.5 mm.-mesh screen, the moist granulate obtained thereby was dried at 45° C., and the dry granulate was again passed through the screen and was then admixed with the remainder of the potato starch and with the magnesium stearate. The finished composition was pressed into 600 mgm.-tablets. Each tablet contained 150 mgm. of the isoquinoline compound and, when administered perorally to a warm-blooded animal of about 60 kg. weight in need of such treatment, produced very good liver ferment activating effects.

EXAMPLE 16

Coated pills.—The pill core composition was compounded from the following ingredients:

| | Parts |
|---|---|
| 3,3 - dimethyl-1-(pyridyl-2')-3,4-dihydro-isoquinoline | 25.0 |
| Colloidal silicic acid | 15.0 |
| Lactose | 63.0 |
| Potato starch | 15.0 |
| Tartaric acid | 1.0 |
| Magnesium stearate | 1.0 |
| Total | 120.0 |

Compounding procedure.—The individual ingredients were admixed and the mixture granulated in a manner analogous to that described in Example 15, and the finished composition was pressed into 120 mgm.-pill cores, which were subsequently coated with a thin shell consisting essentially of sugar and talcum, and polished with beeswax. Each coated pill contained 25 mgm. of the isoquinoline compound and, when administered perorally to a warm-blooded animal of about 60 kg. body weight in need of such treatment, produced very good liver ferment activating effects.

EXAMPLE 17

Hypodermic solution.—The solution was compounded from the following ingredients:

| | Parts |
|---|---|
| 3,3-dimethyl - 1 - (pyridyl-2')-3,4-dihydro-isoquinoline | 50.0 |
| Citric acid·$H_2O$ | 14.0 |
| Secondary sodium phosphate·$2H_2O$ | 6.0 |
| Distilled water q.s. ad 2000.0 parts by vol. | |

Compounding procedure.—The citric acid, the sodium phosphate and the isoquinoline compound were dissolved in a sufficient amount of distilled water, the solution was diluted to the indicated volume with additional distilled water, and the dilute solution was filtered until free from suspended particles. The filtrate was filled into brown 2 cc. ampules, which were sealed and then sterilized for 30 minutes at 100° C. Each ampule contained 50 mgm. of the isoquinoline compound, and when the contents thereof were administered intravenously to a warm-blooded animal of about 60 kg. body weight in need of such treatment, very good liver ferment activating effects were produced.

EXAMPLE 18

Suppositories.—The suppository composition was compounded from the following ingredients:

| | Parts |
|---|---|
| 3,3 - dimethyl - 1 - (pyridyl-2')-3,4-dihydro-isoquinoline | 100.0 |
| Cocoa butter | 1630.0 |
| Total | 1730.0 |

Compounding procedure.—The isoquinoline compound, in finely pulverized form, was stirred with the aid of an immersion homogenizer into the cocoa butter which had previously been melted and cooled to 40° C. The mixture was poured into cooled suppository molds, each holding 1730 mgm. of the mixture. One suppository contained 100 mgm. of the isoquinoline compound and, when administered by the rectal route to a warm-blooded animal of about 60 kg. body weight in need of such treatment, produced very good liver ferment activating effects.

Although the above dosage unit composition examples illustrate only two of the novel compounds of the present invention as active ingredients, it should be understood that any other analogous compound embraced by Formula I or a non-toxic, pharmacologically acceptable acid addition salt thereof may be substituted for the particular isoquinoline compound in Examples 15 through 18. Moreover, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

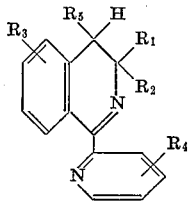

wherein $R_1$ and $R_2$ are each alkyl of 1 to 3 carbon atoms, and $R_3$, $R_4$ and $R_5$ are each hydrogen or methyl, or a non-toxic, pharmacologically acceptable acid addition salt thereof.

2. A compound of the formula

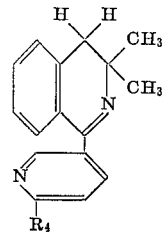

wherein $R_4$ is hydrogen or methyl, or a non-toxic, pharmacologically acceptable acid addition salt thereof.

3. A compound according to claim 2, wherein $R_4$ is methyl.

4. A compound according to claim 2, wherein $R_4$ is hydrogen.

References Cited
UNITED STATES PATENTS 3,133,926  5/1964  Kuehne _____ 260—288X
3,457,265  7/1969  Seeger et al. _____ 260—288

DONALD G. DAUS, Primary Examiner

U.S. Cl. X.R.

260—256, 288, 289; 424—258

UNITED STATES PATENT OFFICE
CERTIFICATE OF CORRECTION

Patent No. 3,595,864    Dated July 27, 1971

Inventor(s) Ernst Seeger, Helmut Teufel, Wolfhard Engel and Hans Machleidt

It is certified that error appears in the above-identified patent and that said Letters Patent are hereby corrected as shown below:

Column 1, line 3: In the title insert --1- -- before "PYRIDYL".

Column 2, line 66: Correct the spelling of "nucleus".

Column 3, line 38: that portion of the formula reading

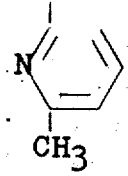

should read

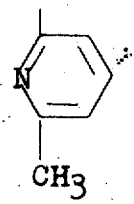

Signed and sealed this 28th day of March 1972.

(SEAL)
Attest:

EDWARD M. FLETCHER, JR.
Attesting Officer

ROBERT GOTTSCHALK
Commissioner of Patents